Dec. 18, 1923.　　　　　　1,478,363
W. F. SCHALLER
HEATING UNIT FOR OVENS
Filed March 24, 1921　　3 Sheets-Sheet 1
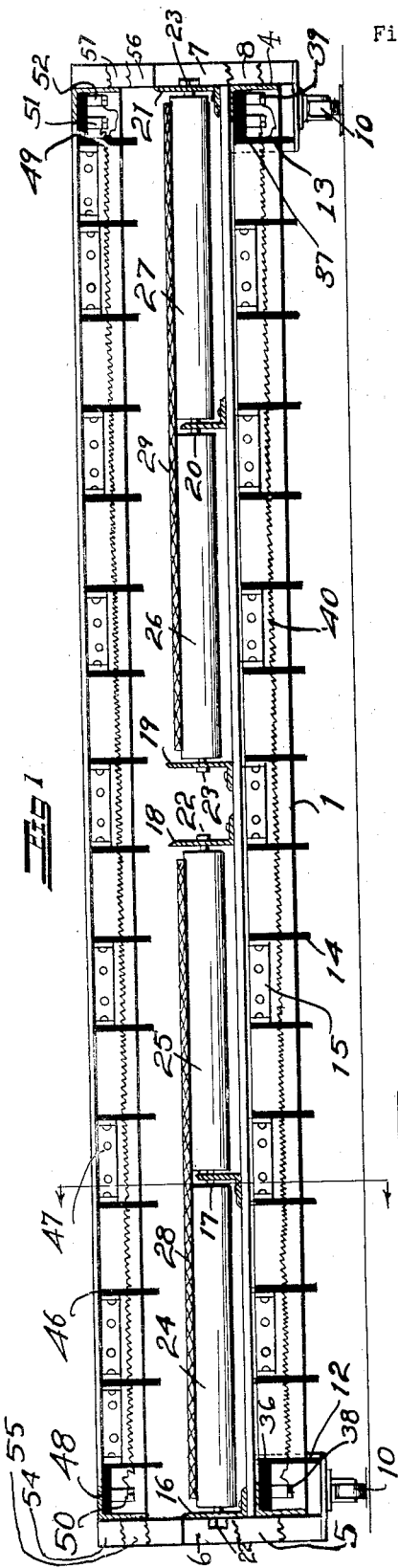
INVENTOR.
W. F. Schaller.
BY
Carlos P. Griffin
ATTORNEY.

Dec. 18, 1923.
W. F. SCHALLER
HEATING UNIT FOR OVENS
Filed March 24, 1921   3 Sheets-Sheet 2
1,478,363
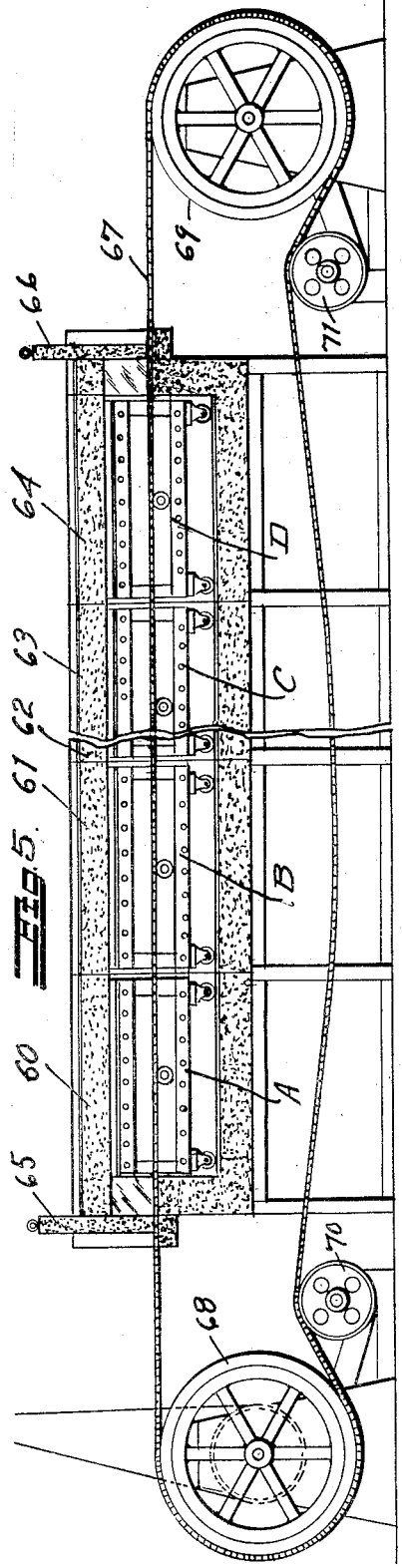
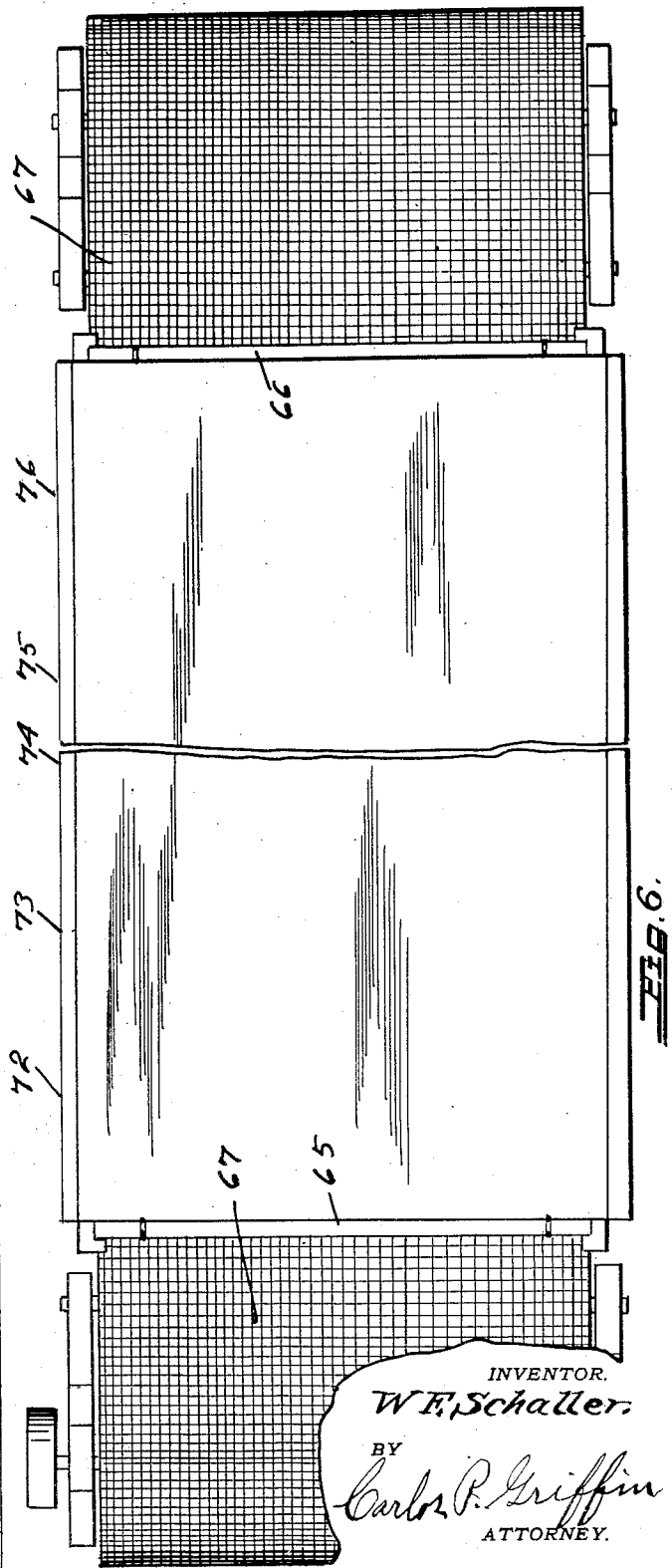
INVENTOR.
W. F. Schaller,
BY
Carlos P. Griffin
ATTORNEY.

Dec. 18, 1923.  
W. F. SCHALLER  
HEATING UNIT FOR OVENS  
Filed March 24, 1921   3 Sheets-Sheet 3
1,478,363
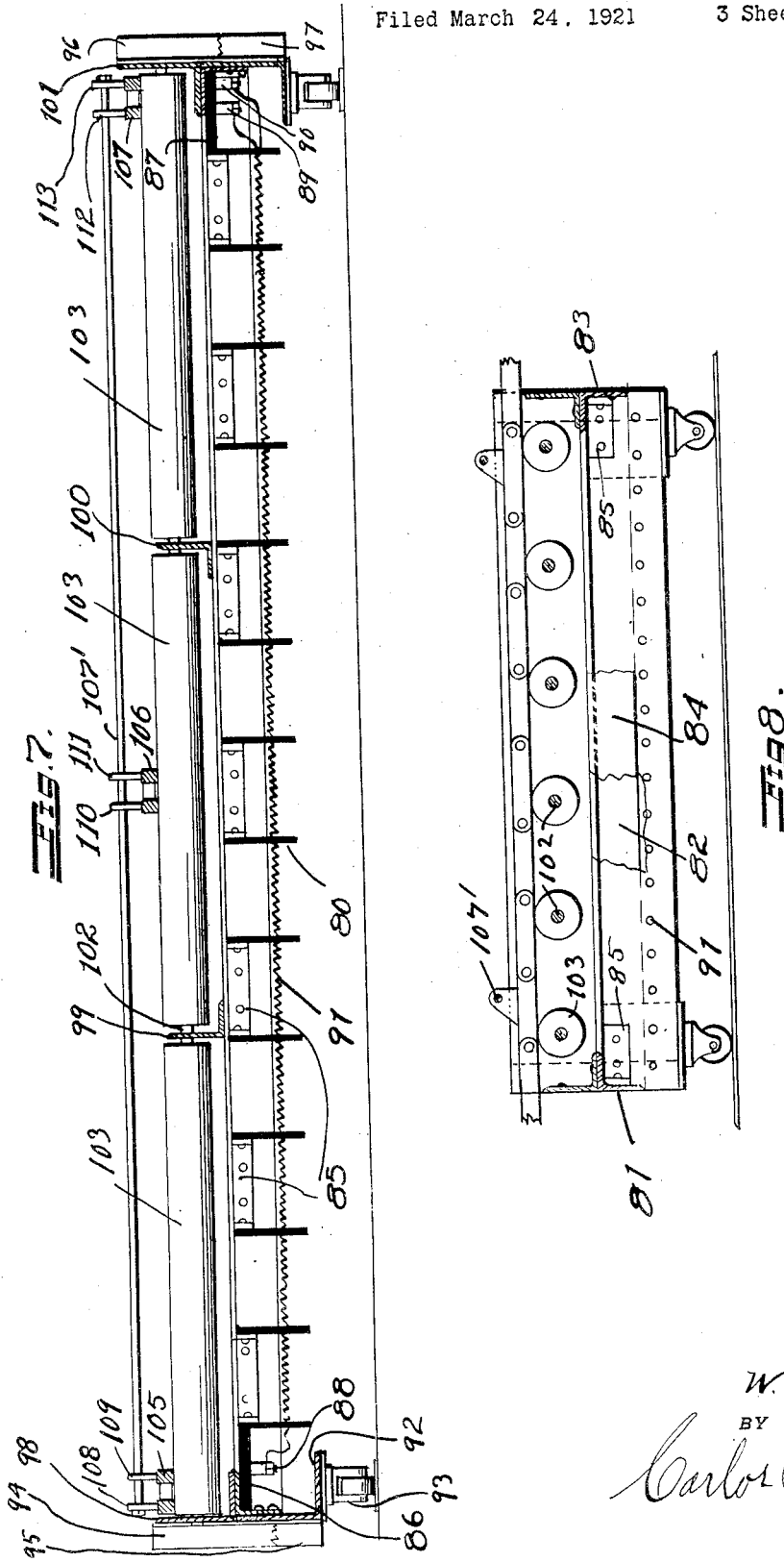
INVENTOR.  
W. F. Schaller.  
BY  
Carlos P. Griffin  
ATTORNEY.

Patented Dec. 18, 1923.

1,478,363

UNITED STATES PATENT OFFICE.

WILLIAM F. SCHALLER, OF SAN FRANCISCO, CALIFORNIA.

HEATING UNIT FOR OVENS.

Application filed March 24, 1921. Serial No. 455,243.

*To all whom it may concern:*

Be it known that I, WILLIAM F. SCHALLER, a citizen of the United States, residing at San Francisco, in the county of San Francisco, State of California, have invented a new and useful Heating Unit for Ovens, of which the following is a specification, in such full and clear terms as will enable those skilled in the art to construct and use the same.

This invention relates to an oven heating unit and the object of the invention is to provide means whereby the heating unit may be removed from the oven without completely dismantling the same and without removing the endless belt from the oven: the belt simply being raised high enough above the bottom portion of the heating unit to allow the same to be removed bodily and a new heating unit thereafter inserted in place.

Another object of the invention is to provide means whereby the heating unit with itself carries the rollers for supporting the endless carrier, thereby enabling the rollers to be removed with the heating unit whenever that becomes necessary.

Another object of the invention is to provide a heating unit with heating coils both above and below the endless carrier thereby more uniformly heating the material placed upon the carrier.

Other objects of the invention will appear as the description proceeds.

An embodiment of the invention is shown in the accompanying drawings in which the same reference numeral is applied to the same portion throughout but I am aware that there may be modifications thereof.

Fig. 1 is a sectional view of one of the heating units.

Fig. 2 is a sectional view of one of the heating units looking at right angles to Figure 1.

Fig. 3 is a sectional view showing the ends of one of the rollers.

Fig. 4 is a view of a portion of the heating unit showing the means for disconnecting the top portion from the lower portion.

Fig. 5 is a longitudinal sectional view of an oven having this heating unit applied thereto.

Fig. 6 is a plan view of the oven shown in Fig. 5.

Fig. 7 is a sectional view of a modified form of heating unit in which the heating coils are all below the endless carrier and Fig. 8 is a sectional view of the heating unit shown in Fig. 7.

The heating unit comprises a rectangular frame made up of angle steel bars 1 to 4 inclusive, forming a rectangular frame to which are secured four posts 5 to 8 inclusive.

At each corner of the frame there is an L shaped plate 9 which is suitably bolted to the rectangular frame formed by the bars 1 to 4 inclusive and which forms the base to which the four castor wheels 10 are connected.

The corner posts rest upon the horizontal portion of the plate 9 at one edge, and the insulating strips 12 and 13 also rest upon the horizontal portion of said plate. Between the insulating strips 12 and 13 there are plurality of other insulating strips 14 precisely the same as insulating strips 12 and 13 and they are supported in pairs by U shaped brackets 15 which are connected to the ends of the insulating strips and to the angle on bars 1 and 2. Connecting the angles 1 and 2 and secured thereto are a plurality of steel angles 16 to 21 which form the supports for rods 22 and 23 which carry the rollers 24 to 27 inclusive, over which rollers the two endless belts 28 and 29 travel. Each roller has a pressed metallic cup 30 at each end into which cup is pressed a well known form of selfcontained ball bearing consisting of a cone 31, balls 32, bearing shell 33 and retainer 34, while bushings 35 on the shafts 22 and 23 hold the rollers in their proper position.

At each side of the frame there are two flat insulating strips 36 and 37 to which the coil terminals 38 and 39 and of which there are a considerable number may be secured. The insulating strips 14 are provided with aligned holes through which the heating wire 40 is passed; there being such a number of holes and coils as the size of the heating unit demands.

The upper portion of the heating unit consists of a rectangular iron frame consisting of the sides 42, 43, 44 and 45. These sides and ends consist of a single piece bent into a rectangular frame and connected together, said frame forming the support for a plurality of flat insulating strips 46. The insulating strips are connected to the frame supporting them by means of a plurality of U shaped brackets 47 in pairs, the same as the insulating strips 14 in the lower part of the frame.

At the sides there are two insulating strips 48 and 49 to which the terminals 50, 51 and 52 are connected; there being a plurality of the terminals in each instance. Also connected to the frame supporting the insulating members 46 are four depending legs 54, 55, 56 and 57 which have their ends socketed as indicated at 58 to receive the pins 5' and to permit the top frame to be removed from the lower carriage by elevating it about ½ an inch whereby the top frame may be removed from the oven without disturbing the lower frame should that become necessary, and whereby when the lower frame is to be removed, the upper frame may be lifted off and removed and the lower frame moved out from under the carriage without disconnecting it by simply lifting the carriers high enough to pass over the top of the supporting angles 16 to 21 inclusive.

The oven itself is made up of a plurality of sections 60 to 64 inclusive in such numbers as may be deemed desirable. The oven has closures 65, 66 at its ends through which the endless carrier 67 in the present instance only a single carrier being shown, passes. This carrier passes around a driving drum 68 and idler drum 69 and over two tighteners 70 and 71. The sides of the oven are indicated at 72 to 76 inclusive and are removable so that the carriages can be removed for inspections and repairs.

It will be understood that the number of carriages depends entirely on the capacity of the oven and the length of the endless carrier required in any given instance.

Also it will be understood that one belt or two belts may be used in connection with the carriages. In the present instance the carriages are indicated at A, B, C and D.

In the form of the invention shown in Figures 7 and 8 there are a plurality of flat insulating strips 80 which are supported by a rectangular angle frame having the sides 81 to 84 inclusive. The insulating strips are connected to the angle iron frame in pairs with U shaped brackets 85 substantially the same as in the previous form of the invention, and at the sides of the frame there are two horizontal extending flat insulating strips 86, 87 to which the terminals 88, 89 and 90 in suitable number are secured. The depending strips have a plurality of holes in alignment for the plurality of coils 91.

At each corner of the frame there is an L shaped plate 92 which plate is connected to the rectangular frame and forms the support to which the castors 93 are connected. Also connected to the frame are four posts 94 to 97 inclusive, which posts are also connected to the L shaped plates 92. The frame also has four angle bars 98 to 101 inclusive, which angle bars form the support for a plurality of shafts 102 carrying the rollers 103 of which the present frame has 18.

In connection with this heating unit there is shown a common form of endless carrier chain consisting of a plurality of links; the chain being arranged in three runs as shown at 105, 106 and 107, and connected together by the rod 107' passing through the chain flights 108 to 113 inclusive.

The form of carrier and heating units shown in Figures 1 to 4 inclusive is intended for use with crackers and cakes where both sides of material are to be quickly and evenly baked, and which cakes may be placed directly upon the carrier upon sheets of paper or upon wide shallow pans.

In the form of the invention shown in Figures 7 and 8 the number of rollers used is sufficiently large in connection with each heating unit to permit the use of pans which extend over about four rollers in width.

What I claim is as follows, but various modifications may be made in the construction shown in the drawings and above particularly described form, within the purview of my invention.

1. An oven heating unit comprising a movable carriage, a plurality of insulating plates carried thereby, a plurality of heating elements supported by the insulating plates, and a roller on the carriage for the support of a movable floor.

2. An oven heating unit comprising a movable carriage, a plurality of insulated plates carried thereby, a plurality of heating elements supported by said plates, and a roller above the heating units for the support of a movable floor.

3. An oven heating unit comprising a movable carriage, a plurality of insulated plates carried thereby, a plurality of electric heating units supported by said plates, and rollers on the carriage for the support of an endless floor.

4. An oven heating unit comprising a movable carriage, a plurality of insulated plates carried thereby, a plurality of electric heating units supported by the plates, and rollers for the support of an endless floor, the heating elements being positioned above and below said rollers.

5. An oven heating unit comprising a movable carriage, a plurality of insulated plates carried thereby, rollers supported on the carriage between the insulated plates to support a movable floor, and ball bearings for the several rollers.

In testimony whereof I have hereunto set my hand this 11th day of March, A. D. 1921.

WILLIAM F. SCHALLER.